(12) United States Patent
Cohen et al.

(10) Patent No.: US 6,815,920 B2
(45) Date of Patent: Nov. 9, 2004

(54) MOTOR DRIVER AND SYSTEM WITH PHASE-SPACED REDUNDANCY

(75) Inventors: David A. Cohen, Port Washington, NY (US); Donald A. Neuhaus, Smithtown, NY (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 10/231,649

(22) Filed: Aug. 30, 2002

(65) Prior Publication Data

US 2003/0052638 A1 Mar. 20, 2003

Related U.S. Application Data

(60) Provisional application No. 60/323,232, filed on Sep. 19, 2001.

(51) Int. Cl.[7] ............................. G05B 11/28; H02P 5/46
(52) U.S. Cl. ........................... 318/599; 318/51; 318/53; 318/55
(58) Field of Search .................... 318/811, 49, 85, 318/47, 599, 255–279, 34–113

(56) References Cited

U.S. PATENT DOCUMENTS

| | | | | |
|---|---|---|---|---|
| 3,586,938 A | * | 6/1971 | Le Gall ........................ | 318/606 |
| 4,135,118 A | * | 1/1979 | Seeger et al. .................. | 318/85 |
| 4,228,391 A | * | 10/1980 | Owen ........................... | 322/35 |
| 4,518,900 A | * | 5/1985 | Nawata ........................ | 318/102 |
| 4,853,602 A | * | 8/1989 | Hommes et al. ............... | 318/38 |
| 5,144,180 A | * | 9/1992 | Satake et al. ................. | 310/212 |
| 5,365,153 A | * | 11/1994 | Fujita et al. .................. | 318/34 |
| 5,389,749 A | * | 2/1995 | Hokari et al. ................ | 187/293 |
| 5,705,909 A | * | 1/1998 | Rajashekara ................. | 318/801 |
| 5,796,233 A | * | 8/1998 | Satake et al. ................. | 318/705 |
| 6,166,469 A | * | 12/2000 | Osama et al. ............... | 310/90.5 |
| 6,259,176 B1 | * | 7/2001 | Isozaki et al. .............. | 310/49 R |
| 6,326,747 B1 | * | 12/2001 | Shiba et al. ................... | 318/85 |
| 6,384,567 B1 | * | 5/2002 | Maeda ........................ | 318/801 |
| 6,392,905 B1 | * | 5/2002 | Huang et al. ................. | 363/71 |
| 6,538,408 B2 | * | 3/2003 | Fowler et al. ............... | 318/498 |

FOREIGN PATENT DOCUMENTS

| | | | | |
|---|---|---|---|---|
| EP | 0447257 | 9/1991 | | |
| JP | 03 261355 | 2/1992 | | |
| JP | 06197593 A | * | 7/1994 | ............. H02P/7/63 |
| JP | 06 327294 | 11/1994 | | |
| JP | 06 276778 | 12/1994 | | |
| WO | 014226 | 6/1994 | | |

OTHER PUBLICATIONS

European Search Report from European Application No. 02255940 dated Nov. 24, 2003.

* cited by examiner

*Primary Examiner*—David Martin
*Assistant Examiner*—Patrick Miller
(74) *Attorney, Agent, or Firm*—Renner, Otto, Boisselle & Sklar, LLP

(57) ABSTRACT

A controller for a motor is provided. The motor includes N redundant M-phase rotor/stator combinations (where N and M are both integers greater than 1). The controller includes N driver circuits each having M outputs. Each of the M outputs of a respective one of the N driver circuits provides pulse-width modulated (PWM) current pulses to a corresponding phase winding in a respective one of the redundant M-phase rotor/stator combinations. Furthermore, the controller includes a control unit operatively coupled to the N driver circuits for providing phase spacing between the N driver circuits. As a result, current pulses provided by the N driver circuits to a same phase winding in each of the redundant M-phase rotor/stator combinations are offset in phase.

13 Claims, 5 Drawing Sheets

MOTOR DRIVER AND SYSTEM WITH PHASE-SPACED REDUNDANCY

This application claims the benefit of Provisional Application No. 60/323,232 filed Sep. 19, 2001.

TECHNICAL FIELD

The present invention relates generally to motors and motor drivers, and more particularly to motors and solid state drivers for the same.

BACKGROUND OF THE INVENTION

Various types of motors, such as brushless dc motors, have multiple phase windings and are operated by driving current pulses through the phase windings over a time interval which is contingent on rotation of the rotor. The motor can be controlled through variation of the effective value of the current pulses.

FIG. 1 is a simplified block schematic of a conventional motor control system. As with the other figures provided herein, the purpose of FIG. 1 is not to illustrate in detail the total construction of a complete motor-control system, but rather to illustrate roughly how particularly essential components of such a system co-act with one another. Consequently, the main purpose of the arrows drawn between the various blocks of the block schematic is to illustrate the flow of information and pulses between these components, rather than to denote the number of electric conductors used to interconnect the components in practice. Since the block schematic relates to a three-phase motor (e.g. variable reluctance, induction, permanent magnet brushless, etc.), three parallel arrows, conductors or lines have been used in the majority of cases, in order to obtain a lucid and clear block schematic. It will be understood that the number of conductors may, in reality, be greater or smaller than that illustrated (depending, for example, on the type of motor, whether the motor is arranged in a delta configuration, wye configuration, etc.).

In the exemplary embodiment, the brushless dc motor 1, which in the block schematic has the form of a variable reluctance motor, has three phase windings A', A"; B', B"; and C', C". The motor is driven by a motor driver circuit 5, which sends pulse-width modulated (PWM) current pulses to the phase windings from corresponding outputs A, B and C. The motor driver circuit 5 may, for instance, have double power stages, in a known manner, with switching transistors (not shown) for each phase. A power source (not shown) incorporates an energy source such as a battery.

The frequency and duration of the current pulses delivered to the phase windings from the motor driver circuit 5 are controlled with driving pulses delivered to the motor driver circuit 5 from a control unit 6. The control unit 6 receives from position sensors 7 information concerning the rotational angle of the rotor of the motor 1. The control unit 6 uses the information from the position sensors 7 to commutate the motor windings. Commutation is the periodic application of current to the proper windings as a function of rotor position in order to allow the motor to rotate with maximum torque. For example, three position sensors 7 of a known kind may be arranged in connection with respective phases in a manner known per se. On the other hand, any known position sensing scheme may be applied as will be appreciated.

The control unit 6 also receives information relating to motor current, i.e. the currents supplied to the phase windings of the motor 1, with the aid of sensors 8. Such information may be used by the control unit 6 to control the speed and/or torque of the motor 1. The sensors 8 may comprise three known sensors, and are arranged in connection with the lines to the phase windings, for example, in a manner known per se. Finally, the control unit 6 also receives control information from an external information source 9. The external information source may, for instance, be constructed to deliver information concerning a set point value relating to motor speed. The control unit 6 is constructed to vary the driving pulse parameters in response to information received from the sensors and from the external information source, for example to vary the pulse width, frequency, effective value and phase position of the driving pulses in relation to the angular position of rotor rotation, in order to achieve a desired motor speed at different operating conditions. In some applications, either the position sensors 7 or the current sensors 8 may be omitted. Each are included herein to illustrate the more general case but are not essential to the invention.

Certain applications require motor control systems which operate at relatively high power levels. In such applications, it has been conventional to configure two or more motor driver circuits 5 in parallel to increase the overall power deliverable to the windings of the motor 1. For example, FIG. 2 illustrates a conventional high power motor control system for driving the motor 1. As is shown, multiple motor driver circuits 5 (e.g., motor drivers #1, #2 and #3) have their respective outputs tied in parallel and coupled to the respective windings of the motor 1. Likewise, the respective inputs of the motor driver circuits 5 are coupled in parallel to the control unit 6. As a result, the motor driver circuits 5 provide identical PWM current pulses to each of the respective phases of the motor 1. In the case where there are three motor driver circuits 5 in parallel, for example, the overall power deliverable to the windings of the motor 1 is increased by a factor of 3.

The conventional high power motor control configuration represented in FIG. 2 may be suitable in many high power applications. There are, however, various shortcomings with such parallel design. For example, the motor driver circuits 5 will draw a substantially larger amount of current from the power source. Moreover, significant electromagnetic interference (EMI) can be generated by the multiple motor driver circuits 5 via the switching transistors, etc., compared to a single motor driver circuit 5.

In view of such types of shortcomings associated with conventional motor control systems, there is a strong need in the art for an improved motor control system. For example, there is a strong need in the art for a motor control system capable of delivering high power yet which minimizes the amount of current drawn from a power source. In addition, there is a strong need in the art for a motor control system that provides reduced EMI even in high power applications.

SUMMARY OF THE INVENTION

A controller for a motor such as a brushless dc motor is provided. The motor includes N redundant M-phase rotor/stator combinations (where N and M are both integers greater than 1). The controller includes N driver circuits each having M outputs. Each of the M outputs of a respective one of the N driver circuits provides pulse-width modulated (PWM) current pulses to a corresponding phase winding in a respective one of the redundant M-phase rotor/stator combinations. Furthermore, the controller includes a control unit operatively coupled to the N driver circuits for providing phase spacing between the N driver circuits. As a result, current pulses provided by the N driver circuits to a same phase winding in each of the redundant M-phase rotor/stator combinations are offset in phase.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE INVENTION

Figure 1:
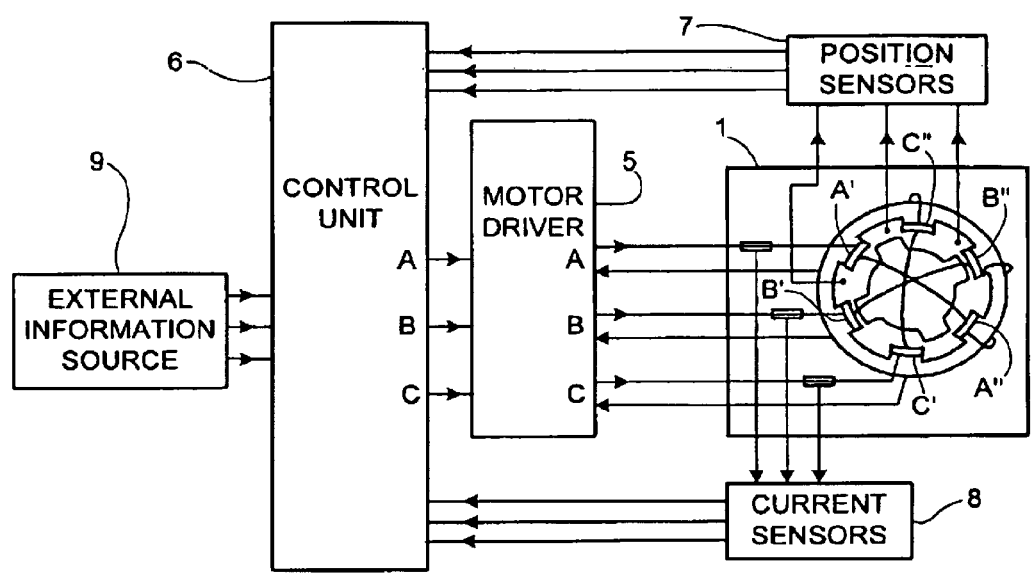
FIG. 1 is a block diagram of a conventional motor control arrangement.

The present invention will now be described in detail with reference to the drawings in which like reference numerals are used to refer to like elements throughout.

Figure 2:
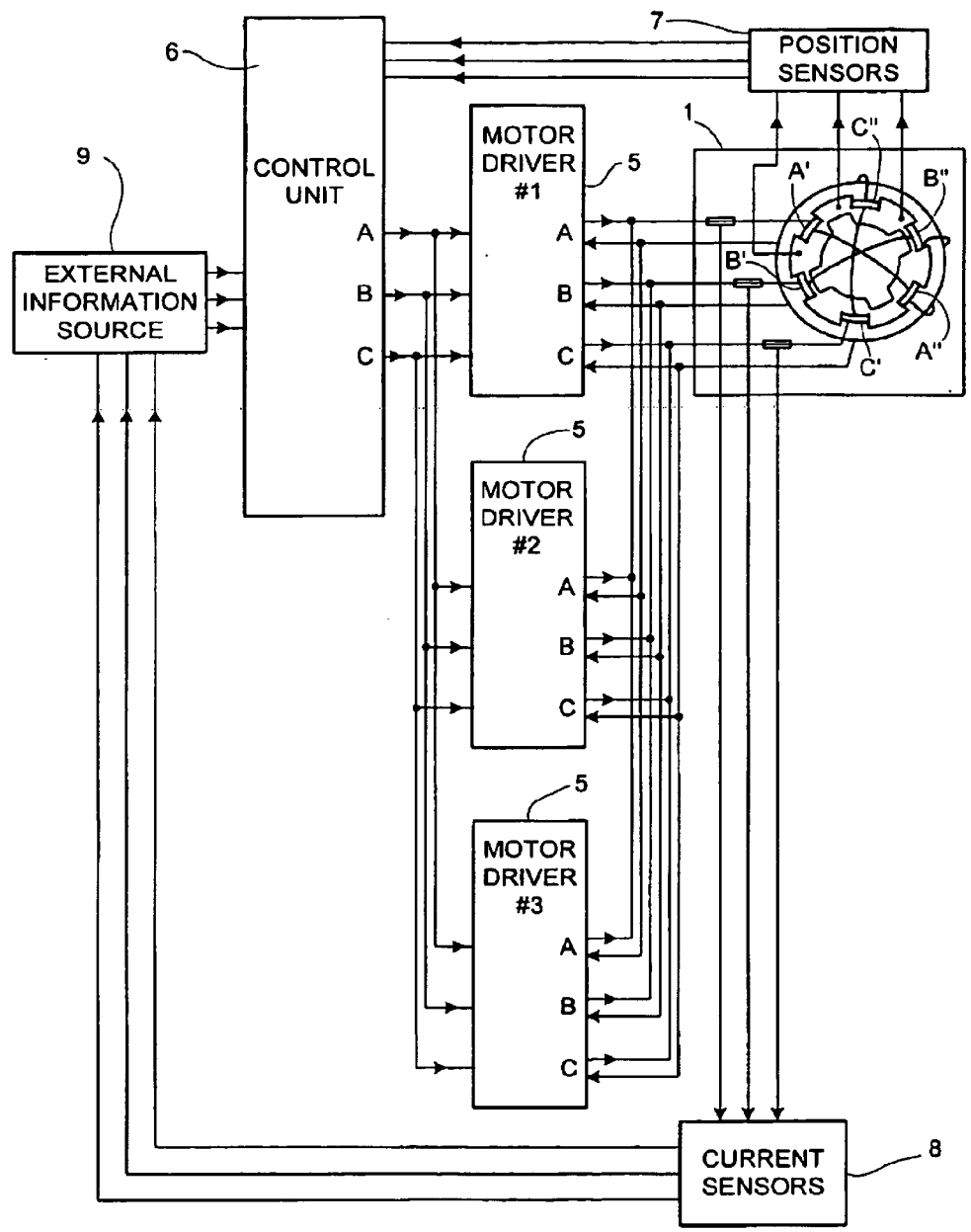
FIG. 2 is a block diagram of a conventional high power motor control arrangement.
Figure 3:
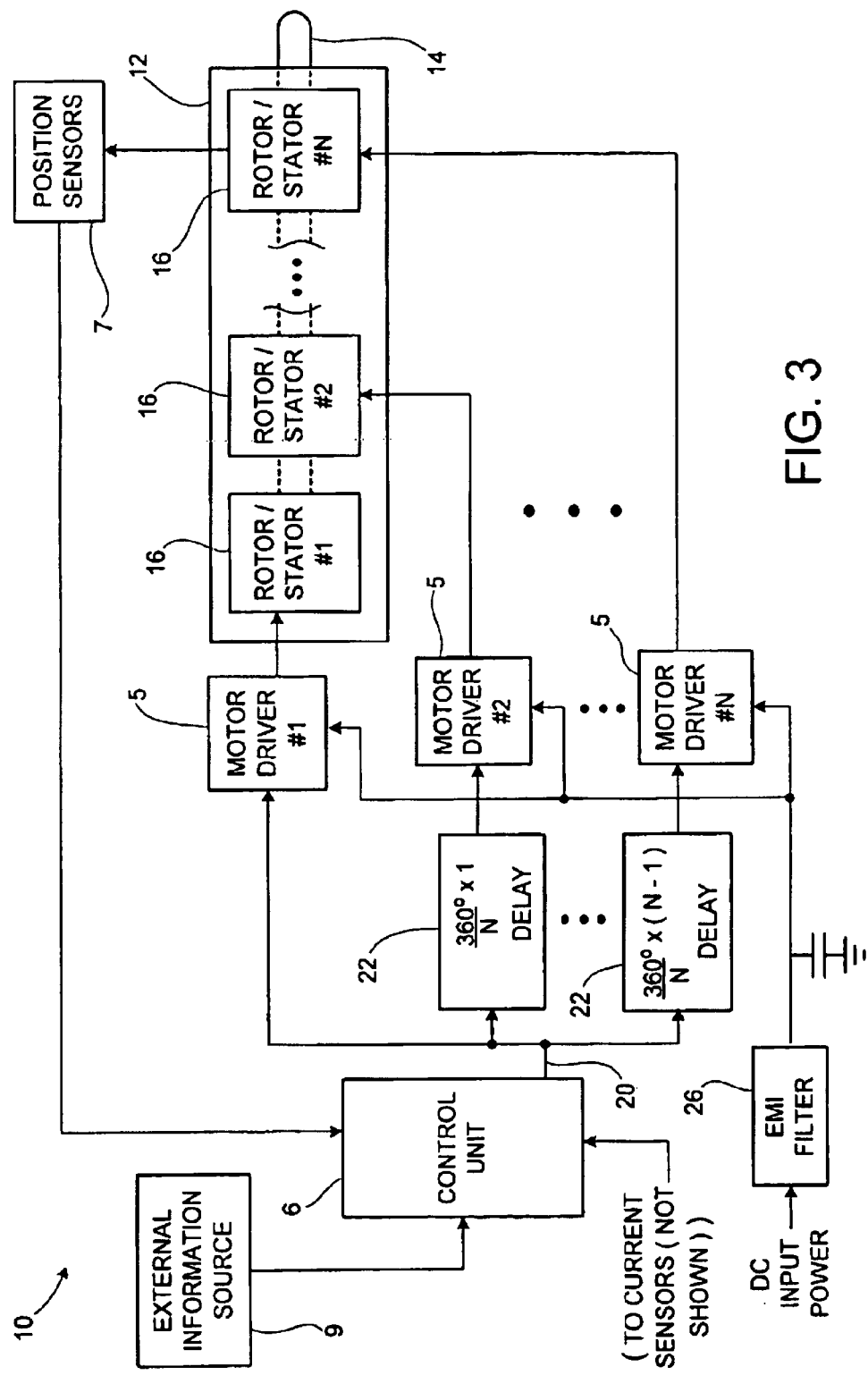
FIG. 3 is a general block diagram of a phase-spaced N-times redundant motor control arrangement for an M phase brushless dc motor in accordance with the present invention.

Referring initially to FIG. 3, a general block diagram of a phase-spaced N-times redundant motor control system 10 for a brushless dc motor 12 is shown in accordance with the present invention. As will be appreciated based on the following description, N is an integer equal or greater than two. Unlike the conventional systems described above in connection with FIGS. 1 and 2, the brushless dc motor 12 includes a rotor/stator configuration which is divided into N separate permanent magnet multi-phase rotors mounted on a common shaft 14 and paired respectively with N separate multi-phase stators. The separate multiphase rotors may share a common permanent magnet or each have its own respective permanent magnet.

Accordingly, the brushless dc motor 12 includes N multi-phase rotor/stator combinations 16 as represented in FIG. 1. For a given size motor 12, each of the N rotor/stator combinations 16 is approximately 1/N th the size of the rotor/stator configuration of a conventional dc motor of equivalent size having a single rotor and stator. The rotor/stator combinations 16 may be mounted, for example, on the common shaft 14 so as to be displaced axially along the length of the shaft 14 as shown in FIG. 1. In addition, the rotor/stator combinations 16 may each be mounted to the shaft 14 with a predefined angular offset. Such angular offset may be used to improve motor performance parameters such as reducing torque ripple by averaging the effects of each rotor/stator combination.

The control system 10 includes N motor driver circuits 5 which are each substantially identical in design and operation to the motor driver circuits 5 of FIGS. 1 and 2. That is, each of the motor driver circuits 5 provides multi-phase current pulses to the respective phase windings of a corresponding one of the rotor/stator combinations 16. Thus, for example, in the case where each of the rotor/stator combinations 16 is designed as three-phase, each of the motor driver circuits 5 is designed to provide three-phase current pulses to the respective phase windings of the corresponding rotor/stator combinations 16. Of course, it will be appreciated that although the present invention will be described in detail in relation to a three-phase design, the particular number of phases, phase configuration, etc. is not germane to the invention.

The control system 10 further includes a control unit 6 which basically can be identical in operation to the control unit 6 discussed above in relation to FIGS. 1 and 2. Specifically, the frequency and duration of the current pulses delivered to the phase windings of the rotor/stator combinations 16 from the corresponding motor driver circuits 5 are controlled with driving pulses delivered to the motor driver circuits 5 from the control unit 6. The control unit 6 receives from position sensors 7 information concerning the rotational angle of the motor 12. In addition, the control unit 6 receives information relating to motor current via the current sensors 8 (not shown in FIG. 3), and external control information from an external information source 9 similar to the embodiments in FIGS. 1 and 2.

The control unit 6 provides driving pulses onto a control bus 20 for controlling the multi-phase windings in each of the rotor/stator combinations 16. More specifically, an identical driving pulse for each corresponding phase is delivered to the appropriate motor driver circuit 5 which controls the respective rotor/stator combination 16. Thus, in a sense the control unit 6 delivers the driving pulses to each of the motor driver circuits 5 in parallel so that each of the motor driver circuits 5 can control the respective multiple phases with current pulses in accordance with the driving pulses.

Notably, however, the present invention intentionally introduces a phase difference or delay between the current pulses of the paralleled motor driver circuits 5. The phase difference between the driving pulses delivered to the respective motor driver circuits 5 is selected to be 360°/N, where again N represents the number of separate rotor/stator combinations 16.

Thus, for example, the control system 10 as shown in FIG. 3 includes a series of phase delays 22 designed to provide a predefined phase delay to the driving pulses delivered to the corresponding motor driver circuits 5. The motor driver circuits 5 will in turn providing current pulses to the respective phase windings of the rotor/stator combinations 16 with the same predefined phase delays. As shown in FIG. 3, the control unit 6 delivers driving pulses to the motor driver #1 directly, i.e., without any phase delay. The motor driver #1 in turn provides corresponding current pulses to the respective windings of the rotor/stator combination #1. The control unit 6 delivers identical driving pulses to the motor driver #2 via a phase delay 22 equal to 360°/N. Accordingly, the motor driver #2 delivers current pulses to the rotor/stator combination #2 which are out-of-phase with those provided to the rotor/stator combination #1 by 360°/N. Similarly, the control unit 6 provides the same driving pulses to motor driver #N via a phase delay 22 equal to (360°/N)*(N−1). As a result, the rotor/stator combination #N receives current pulses which are out-of-phase with the current pulses provided to the rotor/stator combination #1 by (360°/N)*(N−1).

Various advantages are associated with the provision of a phase difference between the otherwise paralleled motor driver circuits 5 in combination with separate rotor/stator combinations 16 in accordance with the present invention. For example, multiple motor driver circuits 5 may be connected in parallel in order to provide increased overall power to the motor 12. Unlike the conventional approach of FIG. 2, however, the current pulses delivered by the motor driver circuits 5 are generally spaced with respect to phase (e.g., by 360°/N). This results in the respective on/off switching of the transistors in the motor driver circuits 5 becoming more distributed with respect to time. Consequently, the total RMS input current used to drive the motor 12 via the control system 10 is reduced. As will be appreciated, the AC RMS current will reduce approximately proportionally to the number of motor driver circuits 5 (i.e., by a factor of N).

Furthermore, the frequency spectrum of the input current will increase. Specifically, the frequency spectrum will increase approximately proportional to N, the number of motor driver circuits 5. For example, where N is equal to three the lowest frequency will increase by three and all harmonics will also increase by three. The increased frequency spectrum together with the reduced input RMS current results in a reduction in the size and weight of the input EMI filter 26 which filters the DC input power to the system 10. Such reduction in the EMI filter 26 can be up to N. This represents a major improvement in avionics electronic actuators, for example, where the EMI filter 26 can be a significant portion of the total electronics package.

Additionally, the paralleled motor driver circuits 5 and rotor/stator combinations 16 provide a multiple redundant system where the redundancy number is equal to N. If one or more motor driver circuits 5 and/or rotor/stator combinations 16 were to fail, for example, the control system 10 could still operate the motor 12 at a reduced level of operation.

Yet further, the control system 10 in accordance with the present invention results in reduced EMI. A major source of radiated EMI in an electronic actuator system is radiation from input power cables and motor cables. The phase-spaced parallel motor driver circuits 5 reduces both the input RMS current and the equivalent motor RMS current. Equivalent motor current is the sum of all the individual driver circuit currents. The reduced RMS cable current results in reduced EMI from those cables.

Figure 4:
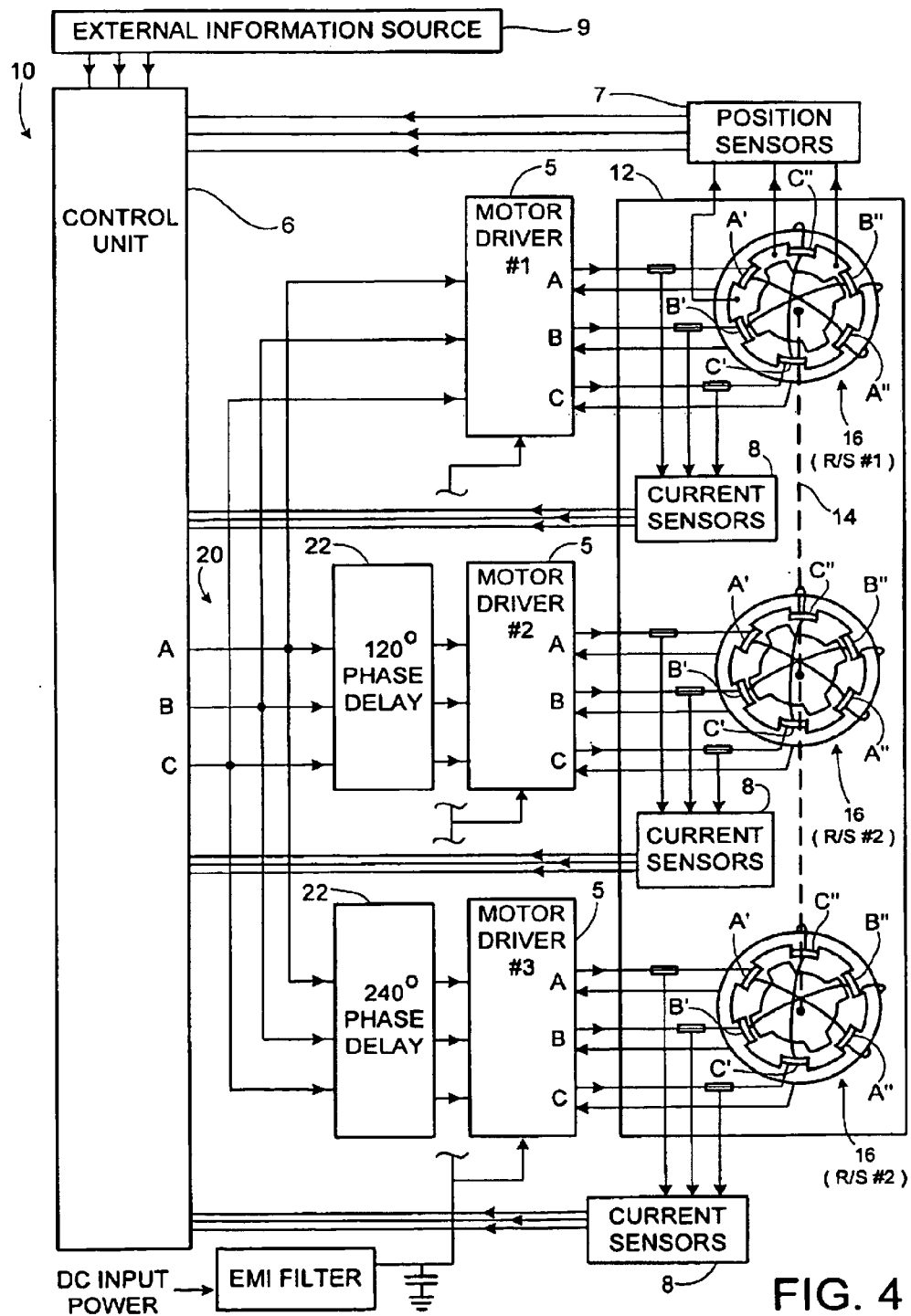
FIG. 4 is a block diagram of a phase-spaced triple redundant motor control arrangement for a three-phase brushless dc motor in accordance with the present invention.
Figure 5:
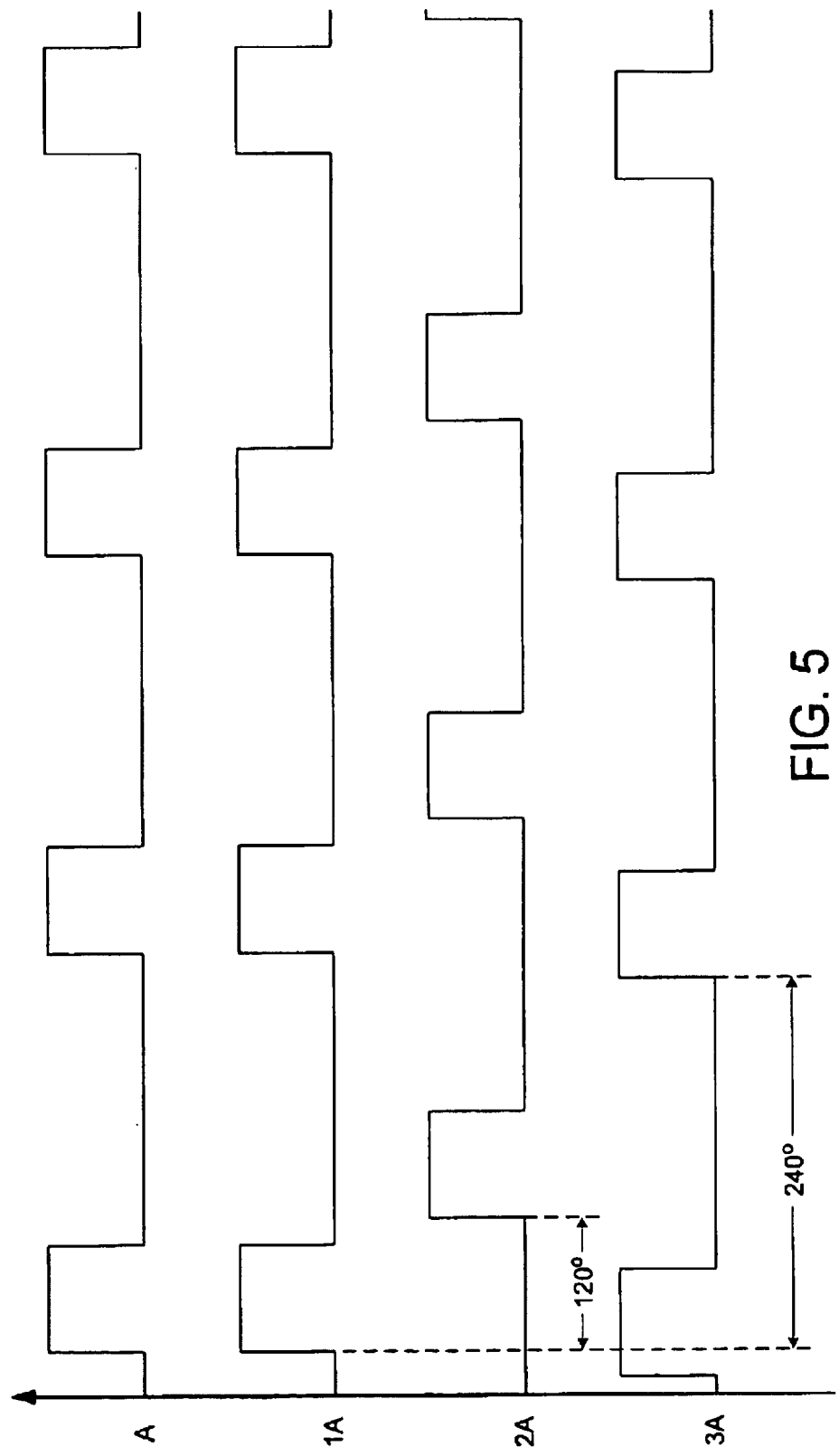
FIG. 5 is an A phase timing diagram illustrating the phase-spacing between the respective A phase driving pulses in accordance with the present invention in relation to the embodiment of FIG. 4.

FIGS. 4 and 5 illustrate a particular example of the present invention in which the control system 10 is designed to control a motor 12 having three (N=3) separate rotor/stator combinations 16. Each rotor/stator combination 16 (i.e., rotor/stator combinations #1, #2 and #3) includes a rotor and stator designed for three-phase operation. Thus, each rotor/stator combination 16 includes its own three-phase windings A', A"; B', B"; and C', C". The motor driver circuits 5 provide the corresponding A, B and C phase current pulses to the respective rotor/stator combinations 16.

Accordingly, the control unit 6 provides A, B and C phase driving pulses to each of the motor driver circuits #1, #2 and #3. As an example, the A phase driving pulses are represented by the top waveform in the timing diagram provided in FIG. 5. The B and C phase driving pulses (not shown in FIG. 5) are similar to the A phase driving pulses. The A, B and C phase driving pulses are provided directly to the motor driver circuit #1 which in turn provides A, B and C phase current pulses to the respective windings A', A"; B', B"; and C', C" of the rotor/stator combination #1 . FIG. 5 denotes the corresponding A phase current pulses delivered by the motor driver circuit #1 as MD1A. For ease of explanation, the A, B and C phase current pulses are represented as being in phase with the A, B and C phase driving pulses from the control unit 6. It will be appreciated, however, that such pulses may not be exactly in phase and it is the relative phase differences among the different motor driver circuits which are germane to the invention.

The control unit 6 similarly provides the A, B and C phase driving pulses to the motor driver circuit #2. In this case, however, a phase delay 22 equal to 120° (360°/N for N=3) is introduced to each of the respective phase driving pulses. As a result, the A, B and C phase current pulses which the motor driver circuit #2 provides to the rotor/stator combination #2 are 120° out-of-phase with those of the motor driver circuit #1 as represented in FIG. 5. As shown in FIG. 5, the MD2A (A phase) current pulses output by the motor driving circuit #2 lag the MD1A current pulses output by the motor driving circuit #1 by 120°. Although not shown in FIG. 5, the B phase and C phase current pulses output by the motor driving circuit #2 similarly lag the B and C phase current pulses output by the motor driving circuit #1, respectively, by 120°.

Similarly again, the control unit 6 provides the A, B and C phase driving pulses to the motor driver circuit #3. In this case, however, a phase delay 22 equal to 240° ((360°/N)* (N−1) for N=3) is introduced to the phase driving pulses. Consequently, the A, B and C phase current pulses which the motor driver circuit #3 provides to the rotor/stator combination #3 are 240° out-of-phase with those of the motor driver circuit #1 as represented in FIG. 5. As shown in FIG. 5, for example, the MD3A (A phase) current pulses output by the motor driving circuit #3 lag the MD1A current pulses output by the motor driving circuit #1 by 240°. The B and C phase current pulses of the motor driving circuit #3 similarly lag those of the motor driver circuit #1 by 240°, as will be appreciated.

In the exemplary embodiment described herein, the present invention has been described primarily in the context of a brushless dc motor and solid state driver for driving the same. However, it will be appreciated that the phase-spaced redundancy of the present invention has application to all types of motors and solid-state driver systems. For example, the phase-spaced redundant principles described herein can be applied to other types of motors such as a variable speed induction motor and corresponding solid state driver. The present invention is considered to encompass any and all of such different types of motors and is not intended necessarily to be limited to the particular types discussed herein.

The present invention has been described according to an embodiment in which phase differences or delays are introduced between the control unit 6 and the motor driver circuits 5. However, it will be appreciated that a number of variations are possible and are all considered within the scope of the present invention. For example, the phase delays 22 may instead be introduced between the motor driver circuits 5 and the respective rotor/stator combinations 16. Moreover, the phase delays 22 need not be discrete elements as shown in the Figures. Rather, the phase delays 22 may be built into the control unit 6 via hardware or software and configurable as desired.

Furthermore, while a phase difference of 360°/N between the respective rotor/stator combinations 16 is considered optimum, it will be appreciated that other phase differences may also be utilized.

In yet another variation of the invention, the rotor/stator combinations 16 in FIG. 3 do not share a common shaft 14. Rather, each rotor/stator combination 16 may represent a separate M phase motor driven by a common control system. In such manner, synchronized phase-spaced PWM current pulses are delivered to all motors, which is also represented by FIG. 5.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A controller for a motor having N redundant M-phase rotor/stator combinations where N and M are both integers greater than 1, comprising:

N driver circuits each having M outputs, wherein each of the M outputs of a respective one of the N driver circuits provides pulse-width modulated (PWM) current pulses to a corresponding phase winding in a respective one of the redundant M-phase rotor/stator combinations; and a control unit operatively coupled to the N driver circuits for providing phase spacing between the N driver circuits whereby current pulses provided by the N driver circuits to a same phase winding in each of the redundant M-phase rotor/stator combinations are offset in phase, wherein the N driver circuits are substantially identical and receive driving pulses from the control unit, and the N driver circuits receive the same driving pulses from the control unit but with different phase delays.

2. The controller of claim 1, wherein the current pulses provided by the N driver circuits to the same phase winding in each of the redundant M-phase rotor/stator combinations are offset in phase by 360/N degrees.

3. The controller of claim 1, wherein the N redundant M-phase rotor/stator combinations share a common shaft.

4. The controller of claim 1, wherein the N redundant M-phase rotor/stator combinations comprise N separate motors.

5. A motor and control system, comprising: a motor having N redundant M-phase rotor/stator combinations sharing a common shaft where N and M are both integers greater than 1;

N driver circuits each having M outputs, wherein each of the M outputs of a respective one of the N driver circuits provides pulse-width modulated (PWM) current pulses to a corresponding phase winding in a respective one of the redundant M-phase rotor/stator combinations; and a control unit operatively coupled to the N driver circuits for providing phase spacing between the N driver circuits whereby current pulses provided by the N driver circuits to a same phase winding in each of the redundant M-phase rotor/stator combinations are offset in phase, wherein the N driver circuits are substantially identical and receive driving pulses from the control unit, and the N driver circuits receive the same driving pulses from the control unit but with different phase delays.

6. motor and control system of claim 5, wherein the current pulses provided by the N driver circuits to the same phase winding in each of the redundant M-phase rotor/stator combinations are offset in phase by 360/N degrees.

7. The motor and control system of claim 5, wherein the rotor/stator combinations are offset in angular position relative to one another.

8. A motor and control system, comprising: a motor having N redundant M-phase rotor/stator combinations sharing a common shaft where N and M are both integers greater than 1;

N driver circuits each having M outputs, wherein each of the M outputs of a respective one of the N driver circuits provides pulse-width modulated (PWM) current pulses to a corresponding phase winding in a respective one of the redundant M-phase rotor/stator combinations; and a control unit operatively coupled to the N driver circuits for providing phase spacing between the N driver circuits whereby current pulses provided by the N driver circuits to a same phase winding In each of the redundant M-phase, rotor/stator combinations are offset in phase, wherein the N redundant M-phase rotor/stator combinations comprise N separate motors.

9. A method for controlling a motor having N redundant M-phase rotor/stator combinations where N and M are both integers greater than 1, comprising the steps of:

providing N driver circuits each having M outputs, wherein each of the M outputs of a respective one of the N driver circuits provides pulse-width modulated (PWM) current pulses to a corresponding phase winding in a respective one of the redundant M-phase rotor/stator combinations; and providing phase spacing between the N driver circuits whereby current pulses provided by the N driver circuits to a same phase winding in each of the redundant M-phase rotor/stator combinations are offset in phase, wherein the N driver circuits are substantially identical, and the N driver circuits receive the same driving pulses but with different phase delays.

10. The method of claim 9, wherein the driving pulses provided by the N driver circuits to the same phase winding in each of the redundant M-phase rotor/stator combinations are offset in phase by 360/N degrees.

11. The method of claim 9, further comprising the step of providing the N redundant M-phase rotor/stator combinations on a common shaft.

12. The method of claim 11, further comprising the step of providing an angular offset in the rotor/stator combinations relative to one another.

13. The method of claim 9, further comprising the step of providing the N redundant M-phase rotor/stator combinations as N separate motors.

* * * * *